(12) United States Patent
Mei et al.

(10) Patent No.: US 11,580,754 B2
(45) Date of Patent: *Feb. 14, 2023

(54) SYSTEM AND METHOD FOR LARGE-SCALE LANE MARKING DETECTION USING MULTIMODAL SENSOR DATA

(71) Applicant: TUSIMPLE, INC., San Diego, CA (US)

(72) Inventors: Xue Mei, San Diego, CA (US); Xiaodi Hou, San Diego, CA (US); Dazhou Guo, San Diego, CA (US); Yujie Wei, San Digo, CA (US)

(73) Assignee: TUSIMPLE, INC., San Diego, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/846,205

(22) Filed: Apr. 10, 2020

(65) Prior Publication Data
US 2020/0242373 A1 Jul. 30, 2020

Related U.S. Application Data

(63) Continuation of application No. 15/822,689, filed on Nov. 27, 2017, now Pat. No. 10,657,390.

(51) Int. Cl.
*G06K 9/00* (2022.01)
*G06V 20/56* (2022.01)
(Continued)

(52) U.S. Cl.
CPC ............ *G06V 20/588* (2022.01); *B60R 11/04* (2013.01); *G01C 21/3826* (2020.08);
(Continued)

(58) Field of Classification Search
CPC .................................................. G06K 9/00798
See application file for complete search history.

(56) References Cited

U.S. PATENT DOCUMENTS 6,777,904 B1 8/2004 Degner
7,103,460 B1 9/2006 Breed
(Continued)

FOREIGN PATENT DOCUMENTS

EP 1754179 A1 2/2007
EP 2448251 A2 5/2012
(Continued)

OTHER PUBLICATIONS

Tan (NPL "Robust Curb Detection with Fusion of 3D Lidar and Camera Data" Senors ISSN 1424-8220, 2014 pp. 1-27) (Year: 2014).*

(Continued)

*Primary Examiner* — Oneal R Mistry
(74) *Attorney, Agent, or Firm* — Paul Liu; Glenn Theodore Mathews; Inventive Law Inc.

(57) ABSTRACT

A system and method for large-scale lane marking detection using multimodal sensor data are disclosed. A particular embodiment includes: receiving image data from an image generating device mounted on a vehicle; receiving point cloud data from a distance and intensity measuring device mounted on the vehicle; fusing the image data and the point cloud data to produce a set of lane marking points in three-dimensional (3D) space that correlate to the image data and the point cloud data; and generating a lane marking map from the set of lane marking points.

20 Claims, 7 Drawing Sheets

(51) Int. Cl.

| | | |
|---|---|---|
| *B60R 11/04* | (2006.01) | |
| *G07C 5/00* | (2006.01) | |
| *G01S 17/42* | (2006.01) | |
| *G06N 3/02* | (2006.01) | |
| *G06T 7/10* | (2017.01) | |
| *G06T 7/246* | (2017.01) | |
| *G06T 5/50* | (2006.01) | |
| *G06N 3/04* | (2023.01) | |
| *G06N 3/08* | (2023.01) | |
| *G01C 21/00* | (2006.01) | |

(52) U.S. Cl.
CPC ..... *G01C 21/3833* (2020.08); *G01C 21/3867* (2020.08); *G01S 17/42* (2013.01); *G06N 3/02* (2013.01); *G06N 3/0454* (2013.01); *G06N 3/08* (2013.01); *G06T 5/50* (2013.01); *G06T 7/10* (2017.01); *G06T 7/246* (2017.01); *G07C 5/008* (2013.01); *G06T 2207/10024* (2013.01); *G06T 2207/10028* (2013.01); *G06T 2207/20221* (2013.01); *G06T 2207/30256* (2013.01)

(56) References Cited

U.S. PATENT DOCUMENTS

| | | |
|---|---|---|
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-Guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2013/0079990 A1* | 3/2013 | Fritsch ............. G06T 7/11 701/41 |
| 2014/0145516 A1 | 5/2014 | Hirosawa |
| 2014/0198184 A1 | 7/2014 | Stein |
| 2014/0368496 A1* | 12/2014 | Strassenburg-Kleciak ............... G06T 15/00 345/419 |
| 2015/0062304 A1 | 3/2015 | Stein |
| 2015/0353082 A1 | 12/2015 | Lee |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0321381 A1 | 11/2016 | English |
| 2016/0375907 A1 | 12/2016 | Erban |
| 2017/0039436 A1* | 2/2017 | Chen ............. G01S 17/86 |
| 2017/0371348 A1* | 12/2017 | Mou ............. G01S 17/42 |
| 2019/0156128 A1* | 5/2019 | Zhang ............. G06K 9/6274 |
| 2019/0163990 A1* | 5/2019 | Mei ............. G06N 3/0454 |

FOREIGN PATENT DOCUMENTS

| | | |
|---|---|---|
| EP | 2463 843 A2 | 6/2012 |
| EP | 2463 843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |

(56) References Cited

FOREIGN PATENT DOCUMENTS

| WO | WO/2015/103159 A1 | 7/2015 |
|---|---|---|
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Improving the Lane Reference Detection for Autonomous Road Vehicle Control Hindawi, (Year: 2016).*
Hou, Xiaodi and Zhang, Liqing, "Saliency Detection: A Spectral Residual Approach", Computer Vision and Pattern Recognition, CVPR'07—IEEE Conference, pp. 1-8, 2007.
Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.
Hou, Xiaodi and Zhang, Liqing, "Dynamic Visual Attention: Searching For Coding Length increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, pp. 1-4, Feb. 25, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.
Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.
Li, Yanghao and Wang, Naiyan and Liu, Jiaying and Hou, Xiaodi, "Factorized Bilinear Models for Image Recognition", arXiv preprint arXiv:1611.05709, pp. 1-9, Mov. 17, 2016.
Hou, Xiaodi, "Computational Modeling and Psychophysics in Low and Mid-Level Vision", California Institute of Technology, pp. i to xi and 1-114, May 7, 2014.
Spinello, Luciano, Triebei, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 13-23, Jan. 1, 2001.
Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv: 1612.06573v1 [cs.CV], pp. 1-8, Dec. 20, 2016.
Schroff, Florian, Dmitry Kalenichenko, James Philbin, (Google), "FaceNet: A Unified Embedding for Face Recognition and Clustering", pp. 1-10, CVPR Jun. 17, 2015.
Dai, Jifeng, Kaiming He, Jian Sun, (Microsoft Research), "Instance-aware Semantic Segmentation via Multi-task Network Cascades", pp. 1-10, CVPR Dec. 14, 2015.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.
Tian Li, "Proposal Free instance Segmentation Based on Instance-aware Metric", Department of Computer Science, Cranberry-Lemon University, Pittsburgh, PA., pp. 1-2, 2015.
Mohammad Norouzi, David J. Fleet, Ruslan Salakhutdinov, "Hamming Distance Metric Learning", Departments of Computer Science and Statistics, University of Toronto, pp. 1-9, 2012.
Jain, Suyong Dutt, Grauman, Kristen, "Active Image Segmentation Propagation", In Proceedings of the IEEE Conference on Computer Vision and Pattern Recognition (CVPR), pp. 1-10, Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.
Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE intelligent Vehicles Symposium, University of California, San Diego, CA, USA, pp. 512-517, Jun. 21-24, 2010.
Peter Welinder, Steve Branson, Serge Beiongie, Pietro Perona, "The Multidimensional Wisdom of Crowds"; http://www.vision.caltech.edu/visipedia/papers/WelinderEtaINIPS10.pdf, pp. 1-9, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.
P. Guarneri, G. Rocca and M. Gobbi, "A Neural-Network-Based Model for the Dynamic Simulation of the Tire/Suspension System While Traversing Road irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.
Thanos Athanasiadis, Phivos Myionas, Yannis Avrithis, and Stefanos Kollias, "Semantic image Segmentation and Object Labeling", IEEE Transactions On Circuits and Systems for Video Technology, vol. 17, No. 3, pp. 298-312, Mar. 2007.
Marius Cordts, Mohamed Omran, Sebastian Ramos, Timo Rehfeld, Markus Enzweller Rodrigo Benenson, Uwe Franke, Stefan Roth, and Bernt Schiele, "The Cityscapes Dataset for Semantic Urban Scene Understanding", Proceedings of the IEEE Computer Society

(56) References Cited

OTHER PUBLICATIONS

Conference on Computer Vision and Pattern Recognition (CVPR), Las Vegas, Nevada, pp. 1-11, 2016.
Adhiraj Sornani, Nan Ye, David Hsu, and Wee Sun Lee, "DESPOT: Online POMDP Planning with Regularization", Department of Computer Science, National University of Singapore, pp. 1-9, 2013.
Adam Paszke, Abhishek Chaurasia, Sangpil Kim, and Eugenio Culurcieilo. Enet: A deep neural network architecture for real-time semantic segmentation, CoRR, abs/1606,02147, pp. 1-10, 2016.
Szeiiski, Richard, "Computer Vision: Algorithms and Applications" http://sz.eliski.org/Book/, pp. i to xxii and 1-957, 2010.

* cited by examiner

SYSTEM AND METHOD FOR LARGE-SCALE LANE MARKING DETECTION USING MULTIMODAL SENSOR DATA

PRIORITY/RELATED DOCUMENTS

This patent document claims the benefit of U.S. patent application Ser. No. 15/822,689, filed on Nov. 27, 2017, which is incorporated herein by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2019-2020, TuSimple Inc, All Rights Reserved.

TECHNICAL FIELD

This patent document pertains generally to tools (systems, apparatuses, methodologies, computer program products, etc.) for image processing, vehicle control systems, vehicle navigation, and autonomous driving systems, and more particularly, but not by way of limitation, to a system and method for large-scale lane marking detection using multimodal sensor data.

BACKGROUND

The detection of lane markings is a prerequisite for many driver assistance systems as well as for autonomous vehicles. Lane markings separate roads from the non-drivable environment and provide information about the position and direction of the lanes and roadways. Detection of lane marking using visual information from cameras is typically used in many conventional lane detection systems. Usually, a camera is mounted on the front of the vehicle to capture the road images. However, the captured images may be of poor quality in various environments, weather conditions, lighting conditions, and the like. Moreover, the lane markings may vary in color (white and yellow for India, USA, and Europe; blue for South Korea), width, continuity, and shape (solid and dashed). As such, conventional lane detection systems cannot perform well in many real-world driving environments.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
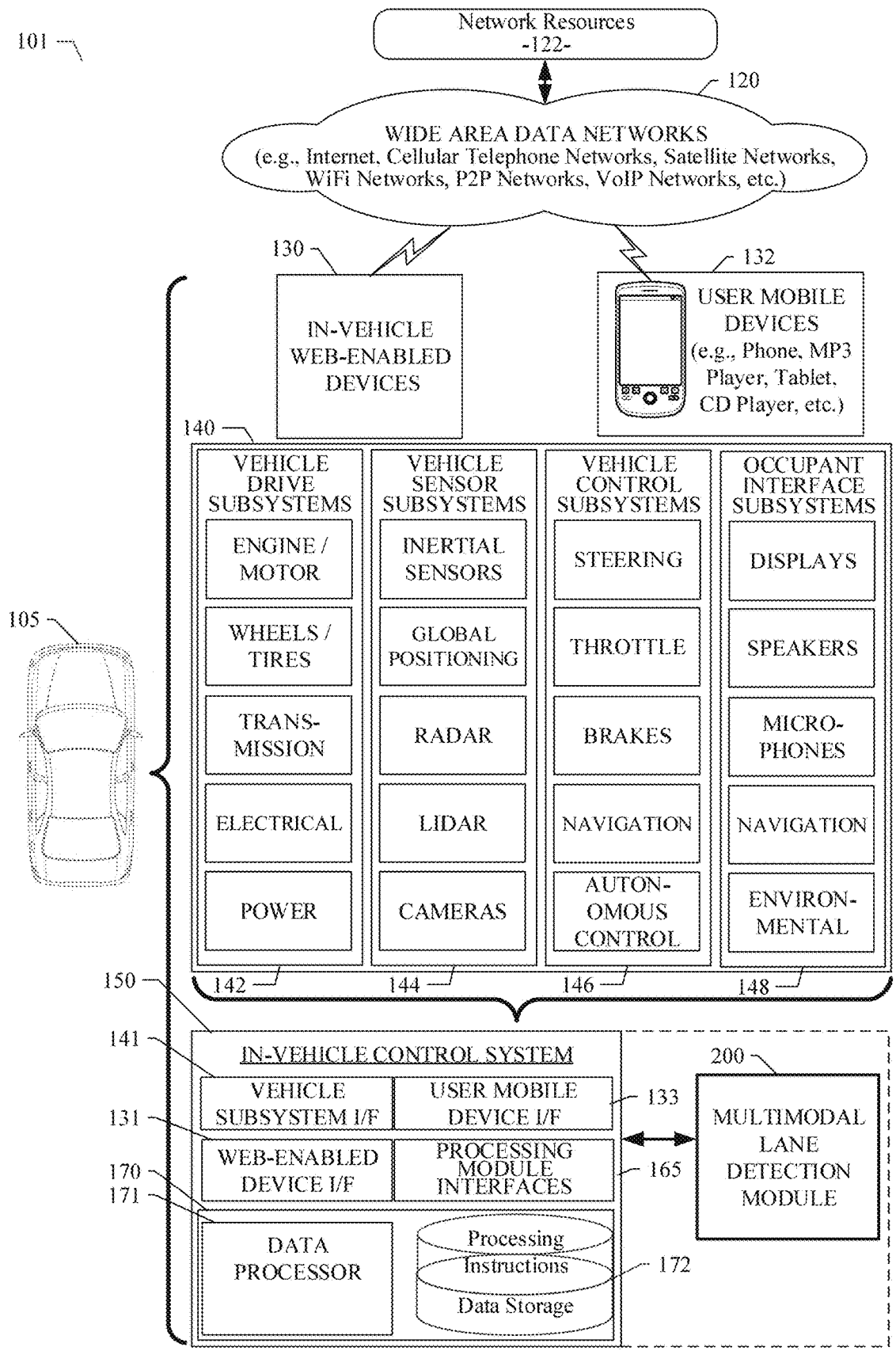
FIG. 1 illustrates a block diagram of an example ecosystem in which a multimodal lane detection module of an example embodiment can be implemented.

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for large-scale lane marking detection using multimodal sensor data are disclosed herein. In various example embodiments described herein, a lane marking detection system and method fuses multimodal sensor data from different types of sensor devices (e.g., cameras, laser light detection and ranging [LIDAR] devices, and the like) and produces accurate lane markings in a lane marking map. By leveraging the advantages of different types of sensors, the various example embodiments described herein can detect lane markings on roads for hundreds of miles with centimeter-level accuracy in conditions that would cause conventional systems to fail.

Some traditional systems focus on utilizing only single modality sensor data (e.g., either camera or LIDAR, but not both). The camera-based approaches rely on image processing or deep learning to detect lane markings in the image space. Empowered by deep learning, these methods can learn features of lanes quite well and they are robust to different types of lane markings. However, subject to the optical limitations of the cameras, image-based methods are susceptible to over-exposure, occlusion, small view angles, and inaccurate two dimensional (2D) to three dimensional (3D) transformations. On the other hand, LIDAR-based methods use 3D positions and intensity as features to detect lane markings. The point clouds captured by LIDAR are inherently in the 3D space and therefore are more accurate in terms of 3D positions. However, LIDAR point clouds are vulnerable to noise or roadside objects that have high reflection intensity, such as rubbles and stones.

The challenges of lane marking detection come from three main aspects:
1) Sensor limitations—Both LIDAR and cameras have their advantages, but could fail under some circumstances. The lane detection system and method must find a proper way to fuse the information from different sensors to mitigate the inability of each type of sensor to reliably provide robust lane marking detection.
2) Sensor calibration—Sensor calibration, such as sensor coordinate transformation or time alignment, are important for accurate lane detection. The lane detection system and method will provide a better result only when the noise introduced during the calibration stage is kept below a certain level.
3) Continuity and smoothness—Highway maps that support autonomous driving must be continuous and smooth, even when the lane marking length could sometimes reach up to hundreds of miles. In this situation, the system must be able to deal with ramps, merges, and exits to guarantee the continuity of the detected lane markings.

The various example embodiments described herein use multimodal sensor data to produce accurate and reliable lane marking detection. The example embodiments also can produce among the following features and benefits as well:
1) A fusion of multimodal sensor data to generate a lane marking map that utilizes the advantages of multiple types of sensors.
2) Introduction of a sub-pixel linearly decreasing function from close to far to address the perspective projection problem. In one example embodiment, more LIDAR projected points far away are given the same distance to the fitted lines to accommodate perspective projection.
2) The systems and methods described herein can detect solid or dotted lane markings, and also non-traditional lane separators, such as cat's eyes or reflectors.
4) The various example embodiments described herein are configured to obtain an adaptive threshold for the lane markings from image based road segmentation. As a result, the various example embodiments can learn to detect lane markings even through different types of road surfaces, weather conditions, lighting conditions, construction zones, and the like.

These and other features and benefits of the systems and methods for large-scale lane marking detection using multimodal sensor data in various example embodiments are described in more detail below.

Referring now to FIG. 1, various example embodiments disclosed herein can be used in the context of a control system 150 in a vehicle ecosystem 101. In one example embodiment, a control system 150 with a multimodal lane detection module 200 resident in a vehicle 105 can be configured like the architecture and ecosystem 101 illustrated in FIG. 1. However, it will be apparent to those of ordinary skill in the art that the multimodal lane detection module 200 described and claimed herein can be implemented, configured, and used in a variety of other applications and systems as well.

Referring again to FIG. 1, a block diagram illustrates an example ecosystem 101 in which a control system 150 and a multimodal lane detection module 200 of an example embodiment can be implemented. These components are described in more detail below. Ecosystem 101 includes a variety of systems and components that can generate and/or deliver one or more sources of information/data and related services to the control system 150 and the multimodal lane detection module 200, which can be installed in the vehicle 105. For example, a camera installed in the vehicle 105, as one of the devices of vehicle subsystems 140, can generate image and timing data that can be received by the control system 150. The control system 150 and the multimodal lane detection module 200 executing thereon can receive this image and timing data input. As described in more detail below, the multimodal lane detection module 200 can process the input image data, process the input LIDAR point clouds, process the input vehicle metric data (e.g., vehicle position, speed, heading etc.), perform lane detection using the multimodal sensor data, as described in more detail below, and produce a corresponding lane marking map. The results of the processing can be used to accurately detect lane boundaries proximate to the location of the autonomous vehicle 105. The lane boundary information can be used by an autonomous vehicle control subsystem, as another one of the subsystems of vehicle subsystems 140. The autonomous vehicle control subsystem, for example, can use the lane boundary information to safely and efficiently control the vehicle 105 in a real world or simulated driving scenario while avoiding obstacles and safely controlling the vehicle.

In an example embodiment as described herein, the control system 150 can be in data communication with a plurality of vehicle subsystems 140, all of which can be resident in a user's vehicle 105. A vehicle subsystem interface 141 is provided to facilitate data communication between the control system 150 and the plurality of vehicle subsystems 140. The control system 150 can be configured to include a data processor 171 to execute the multimodal lane detection module 200 for processing image data, LIDAR data, and vehicle metric data received from one or more of the vehicle subsystems 140. The data processor 171 can be combined with a data storage device 172 as part of a computing system 170 in the control system 150. The data storage device 172 can be used to store data, processing parameters, and data processing instructions. A processing module interface 165 can be provided to facilitate data communications between the data processor 171 and the multimodal lane detection module 200. In various example embodiments, a plurality of processing modules, configured similarly to multimodal lane detection module 200, can be provided for execution by data processor 171. As shown by the dashed lines in FIG. 1, the multimodal lane detection module 200 can be integrated into the control system 150 or optionally downloaded to the control system 150.

The control system 150 can be configured to receive or transmit data from/to a wide-area network 120 and network resources 122 connected thereto. A web-enabled device 130 and/or a user mobile device 132 can be used to communicate via network 120. A web-enabled device interface 131 can be used by the control system 150 to facilitate data communication between the control system 150 and the network 120 via the web-enabled device 130. Similarly, a user mobile device interface 133 can be used by the control system 150 to facilitate data communication between the control system 150 and the network 120 via the user mobile device 132. In this manner, the control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via web-enabled devices 130 or user mobile devices 132. The network resources 122 can also host network cloud services, which can support the functionality used to compute or assist in processing image input or image input analysis. Antennas can serve to connect the control system 150 and the multimodal lane detection module 200 with the data network 120 via cellular, satellite, radio, or other conventional signal reception mechanisms. Such cellular data networks are currently available (e.g., Verizon™ AT&T™, T-Mobile™, etc.). Such satellite-based data or content networks are also currently available (e.g., SiriusXM™, HughesNet™, etc.).

The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the control system 150 and the multimodal lane detection module 200 can receive web-based data or content via web-enabled device interface 131, which can be used to connect with the web-enabled device receiver 130 and network 120. In this manner, the control system 150 and the multimodal lane detection module 200 can support a variety of network-connectable devices and systems from within a vehicle 105.

As shown in FIG. 1, the control system 150 and the multimodal lane detection module 200 can also receive data, image processing or LIDAR data processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the control system 150 and the multimodal lane detection module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a global positioning system (GPS) data receiver, accelerometers, WiFi triangulation, or other geolocation sensors or components in the mobile device, which can be used to determine the real-time geo-location of the user (via the mobile device) at any moment in time. In any case, the control system 150 and the multimodal lane detection module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the control system 150 via vehicle subsystem interface 141 may include information or vehicle metrics related to the state of one or more of the components or subsystems of the vehicle 105. In particular, the data signals, which can be communicated from the vehicle operational subsystems 140 to a Controller Area Network (CAN) bus of the vehicle 105, can be received and processed by the control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the control system 150, the computing system 170, and the multimodal lane detection module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information or vehicle metrics related to an environment or condition of the vehicle 105. For example, the vehicle sensor subsystem 144 may include an inertial measurement unit (IMU), a Global Positioning System (GPS) transceiver, a Radar unit, a laser range finder/LIDAR unit (or other distance and intensity measuring device), and one or more cameras or image capturing devices. The vehicle sensor subsystem 144 may also include sensors configured to monitor internal systems of the vehicle 105 (e.g., an $O^2$ monitor, a fuel gauge, an engine oil temperature, etc.). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The Radar unit may represent a system that utilizes radio signals to sense objects within the local environment of the vehicle 105. In some embodiments, in addition to sensing the objects, the Radar unit may additionally be configured to sense the speed and the heading of the objects proximate to the vehicle 105. The laser range finder or LIDAR unit (or other distance measuring device) may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The laser range finder/LIDAR unit is typically configured to produce point clouds representing measured distances at various points in three dimensional (3D) space in front of or adjacent to a vehicle on which the laser range finder/LIDAR unit is mounted. The cameras or image capturing devices may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit. The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the multimodal lane detection module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the multimodal lane detection module 200, the GPS transceiver, the Radar, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, machine learning training data, semantic label image data, LIDAR point cloud data, lane boundary information, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the multimodal lane detection module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, control system 150, and multimodal lane detection module 200, as being integrated into the vehicle 105, one or more of these components could be mounted or associated separately from the vehicle 105. For example, data storage device 172 could, in part or in full, exist separately from the vehicle 105. Thus, the vehicle 105 could be provided in the form of device elements that may be located separately or together. The device elements that make up vehicle 105 could be communicatively coupled together in a wired or wireless fashion. In various example embodiments, the control system 150 and the multimodal lane detection module 200 in data communication therewith can be implemented as integrated components or as separate components. In an example embodiment, the software components of the control system 150 and/or the multimodal lane detection module 200 can be dynamically upgraded, modified, and/or augmented by use of the data connection with the mobile devices 132 and/or the network resources 122 via network 120. The control system 150 can periodically query a mobile device 132 or a network resource 122 for updates or updates can be pushed to the control system 150.

In an example embodiment, the multimodal lane detection module 200 can be configured to include an interface with the control system 150, as shown in FIG. 1, through which the multimodal lane detection module 200 can send and receive data as described herein. Additionally, the multimodal lane detection module 200 can be configured to include an interface with the control system 150 and/or other ecosystem 101 subsystems through which the multimodal lane detection module 200 can receive ancillary data from the various data sources described above. The ancillary data can be used to augment, modify, or train the operation of the multimodal lane detection module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein. As described above, the multimodal lane detection module 200 can also be implemented in systems and platforms that are not deployed in a vehicle and not necessarily used in or with a vehicle.

System and Method for Large-Scale Lane Marking Detection Using Multimodal Sensor Data Various example embodiments disclosed herein describe a system and method for large-scale lane marking detection using multimodal sensor data. In particular, example embodiments provide systems and methods supporting advanced driver assistance systems or autonomous driving systems to generate accurate lane marking detection with multimodal sensor data by using image analysis supported by a convolutional neural network, LIDAR point cloud data processing, and vehicle metrics from the vehicle GPS and IMU subsystems. Example embodiments are described in more detail below.

Figure 2:
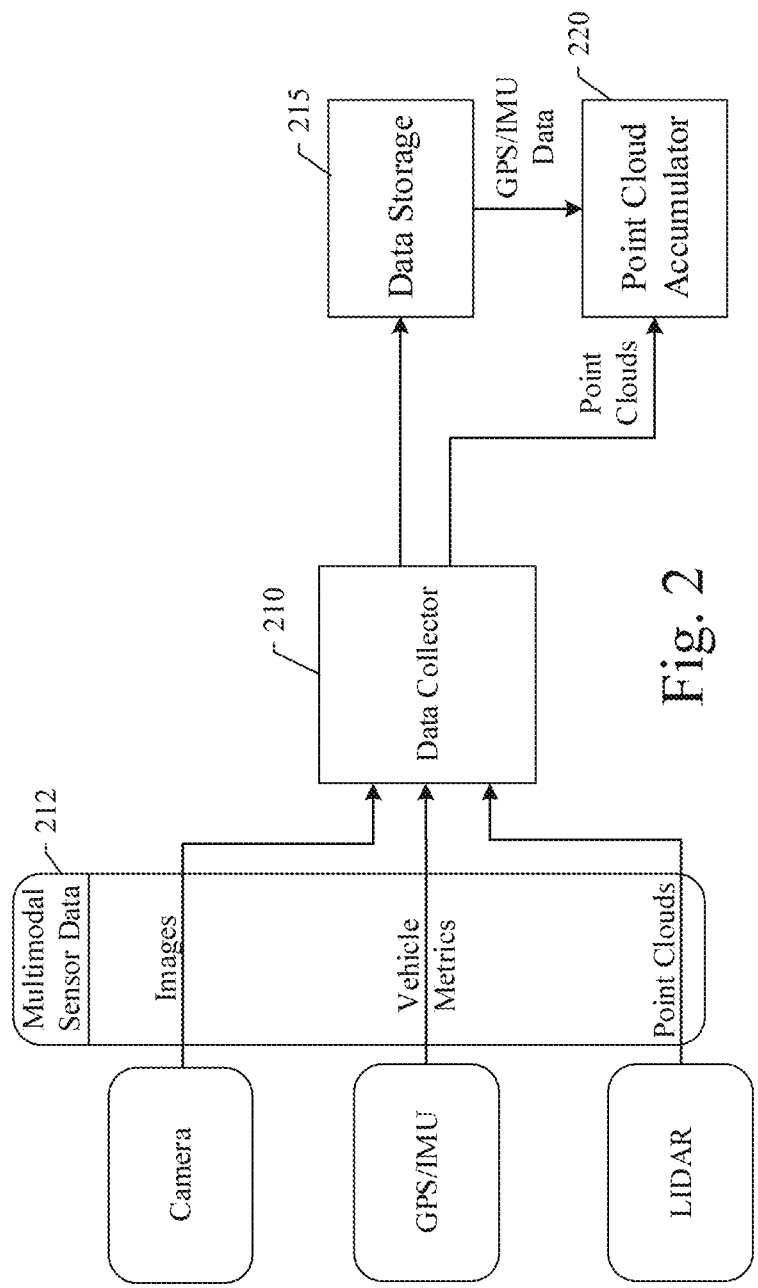
FIGS. 2 and 3 illustrate the components of the multimodal lane detection module of an example embodiment.
Figure 3:
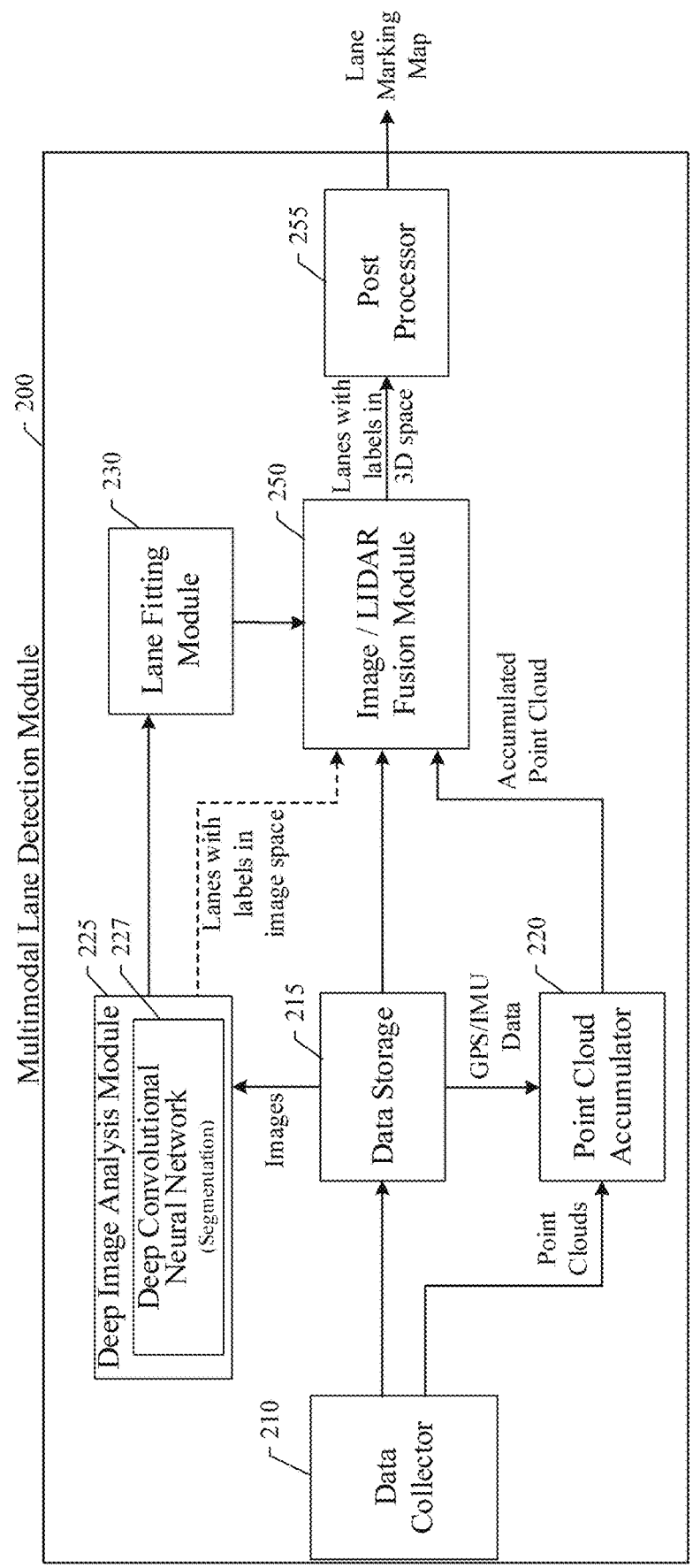

Referring now to FIGS. 2 and 3, the components of an example embodiment are illustrated. The components shown in FIGS. 2 and 3 can be implemented as software modules or components of the control system 150 and/or the multimodal lane detection module 200. It will be apparent to those of ordinary skill in the art in view of the disclosure herein that the illustrated components can be implemented as integrated components or as separate components. Each of these modules can be implemented as software, firmware, or other logic components executing or activated within an executable environment of the multimodal lane detection module 200 operating within or in data communication with the control system 150. Each of these modules of an example embodiment is described in more detail below in connection with the figures provided herein.

Referring to FIG. 2, a data collector 210 can be configured to gather multimodal sensor data 212 from a plurality of different types of sensors (e.g., cameras or image capture devices, LIDAR devices, and vehicle sensor subsystems 144, such as the GPS and IMU subsystems). In an example embodiment, the sensor modules, both LIDAR and camera, can be mounted on the top or front of the vehicle 105 while the camera is positioned to face the front of the vehicle. The images or image data and timing data from the cameras can be obtained by the data collector 210 and processed for time and location alignment with the point cloud data received from the LIDAR. The GPS and IMU data received with the vehicle metrics can be used to determine the location, orientation, and speed of the vehicle and thereby enable the correlation and time alignment of the image data with the point cloud data. In an example embodiment, the image data and the point cloud data can be transformed to a common coordinate space—the image data in a 2D image space and the point cloud data in a 3D space. The aligned image data can be stored in a data storage module 215 for use by the other processing modules of the multimodal lane detection module 200 shown in FIG. 3. The other modules can use the data storage module 215 as an input source for the aligned image data. The point cloud data obtained by the data collector 210 from the LIDAR can be passed to a point cloud accumulator 220, which can register the point cloud data within a time range to the common coordinate space and generate an accumulated LIDAR point cloud representing a collection of aligned point cloud data over time. The point cloud accumulator 220 can also use the GPS and IMU data to determine the location, orientation, and speed of the vehicle and thereby enable the correlation and time alignment of the accumulated point cloud data. The accumulated and aligned point cloud data can be retained in the point cloud accumulator 220 for use by the other processing modules of the multimodal lane detection module 200 shown in FIG. 3. The other modules can use the point cloud accumulator 220 as an input source for the accumulated and aligned point cloud data.

Referring now to FIG. 3, other processing modules of the multimodal lane detection module 200 are shown. As described above, the data storage module 215 provides an input source for the aligned image data and the point cloud accumulator 220 provides an input source for the accumulated and aligned point cloud data. As shown in FIG. 3, the multimodal lane detection module 200 includes a deep image analysis module 225 for processing the aligned image data received from the cameras via the data collector 210 and the data storage module 215. The deep image analysis module 225 can be configured to process the received image data and apply image segmentation using a deep convolutional neural network 227. Image semantic segmentation is used to identify the image regions corresponding directly to objects in an image by labeling each pixel in the image with a semantic category. As such, semantic segmentation assigns a category label to each pixel to indicate an object type to which the pixel belongs. In the context of lane marking detection, the deep convolutional neural network 227 can be trained to recognize and label pixels of an input image that are likely related to a lane marker.

Prior to real-time operational use, the deep convolutional neural network 227 can be trained to produce the desired output for a given input. In an example embodiment, there are two main objectives during the neural network training phase. Firstly, the neural network should learn to categorize each pixel into the correct class or category, which is performed by the semantic segmentation operation of the deep convolutional neural network 227. Secondly, the neural network should learn to particularly categorize each pixel into classes corresponding to lane marking objects. To configure or train the neural network in this manner, training images of lane markings in a wide variety of contexts, environments, locations, weather conditions, lighting conditions, and the like are used in an offline training process to configure parameters of the neural network. The training images can include corresponding object labeling created manually by human labelers or automated processes. By use of the labeled training images, the neural network can be trained to categorize each pixel of an input image into classes or categories corresponding to lane marking objects, when appropriate. In an example embodiment, the segmentation process can first distinguish lane marking objects from the background pixels of an input image. Secondly, the segmentation process can consider only the pixels recognized as lane marking objects and then distinguish particular instances of lane objects from each other.

Figure 4:
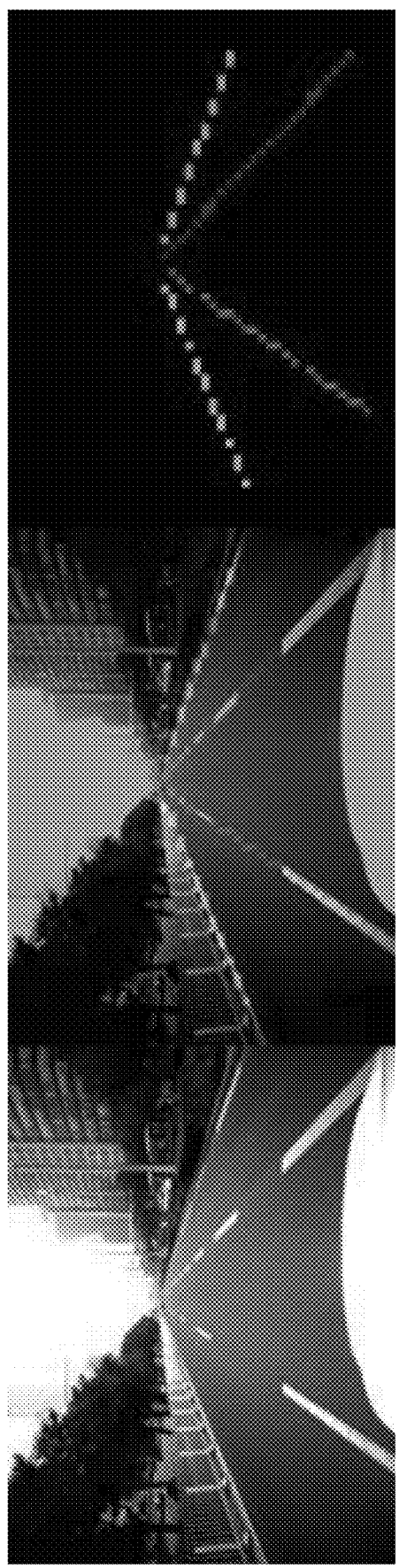
FIGS. 4 and 5 illustrate sample images of roadway lane markings processed by an example embodiment.

Referring now to FIG. 4, three related image samples show an example of a roadway with lane markings. In the image portion on the left side of FIG. 4, the raw image received from a vehicle camera is shown. In the center image portion in the middle of FIG. 4, the raw image received from the vehicle camera is shown after a semantic segmentation process has identified and labeled objects in the image. In this example, roadway lane and boundary markings have been identified and highlighted. In the image portion on the right side of FIG. 4, the background image elements have been removed leaving only the highlighted roadway lane and boundary markings. These image samples illustrate the sequence of operations performed in an example embodiment for processing an input image to identify and isolate image objects related to roadway lane and boundary markings.

Figure 5:
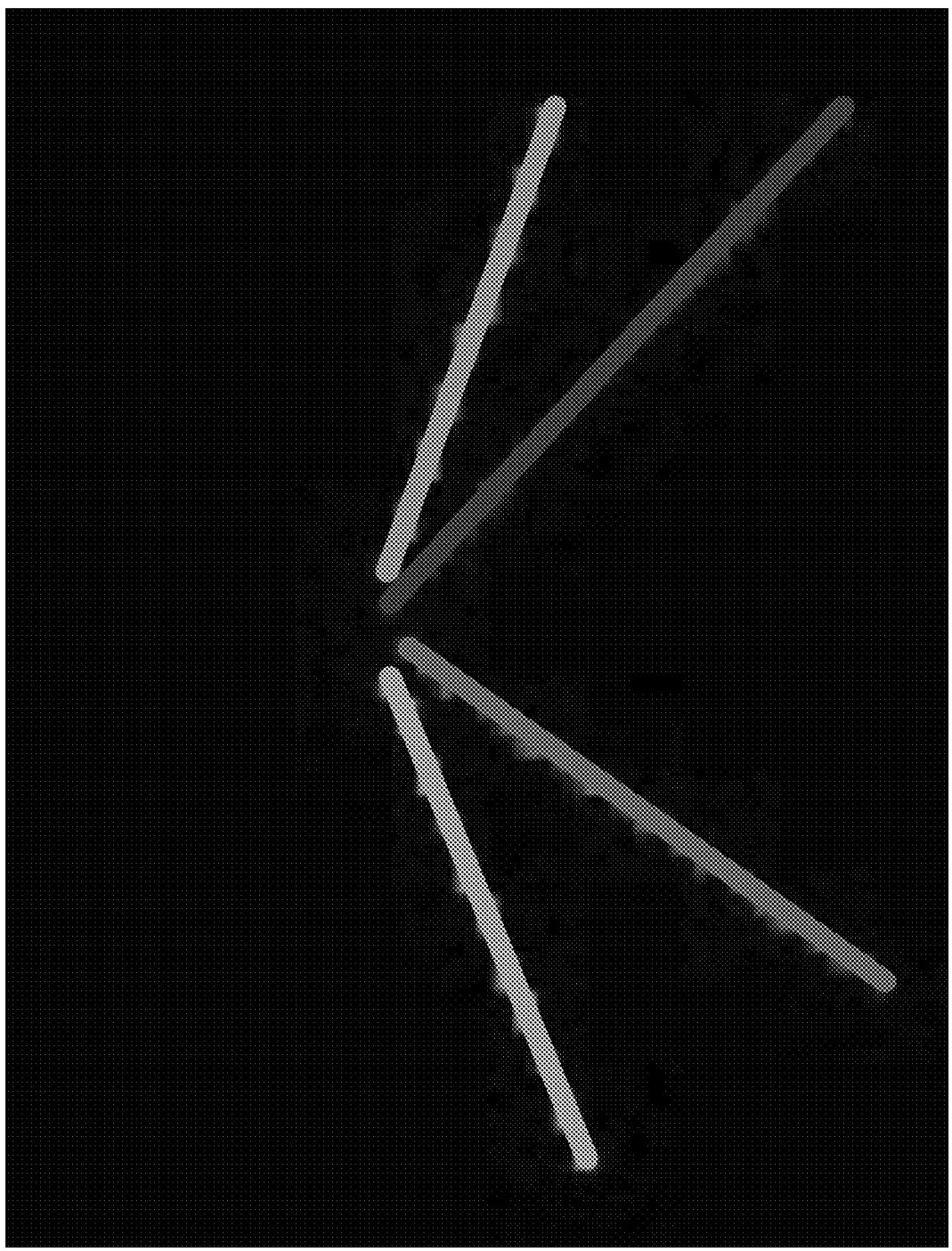

Referring again to FIG. 3, the deep image analysis module 225 can receive aligned image data from the data storage module 215 and use the trained deep convolutional neural network 227 to produce lane marking object data and road segmentation data as segmented image data. The segmented image data can include labeled lane marking objects, which can be represented in a 2D image space. An example of this representation in a 2D image space is shown in the right image portion of FIG. 4. The road segmentation data can correspond to the portions of the image that can be categorized as likely road surface. Referring still to FIG. 3, the segmented image data produced by the deep image analysis module 225 can be provided as an input to the lane fitting module 230. The lane fitting module 230 can be configured to fit a piecewise line for each lane marking object detected in the segmented image data. The output produced by the lane fitting module 230 can be a segmented image consisting of a plurality of piecewise lines indicating, for example, the left boundary marking of the driving lane, the right boundary marking of the driving lane, the left boundary marking of the neighboring left lane, and right boundary marking of the neighboring right lane. An example of this representation in the 2D image space is shown in FIG. 5. The segmented image data including the plurality of piecewise lines for the lane markings and corresponding road image data can be provided as an input to an image/LIDAR fusion module 250 as shown in FIG. 3. In some embodiments, the segmented image data including labeled lane marking objects as produced by the deep image analysis module 225 can be provided to the image/LIDAR fusion module 250. Additionally, the point cloud accumulator 220 can provide the accumulated point cloud data, as described above, as an input to the image/LIDAR fusion module 250. The image/LIDAR fusion module 250 can also pull data retained in the data storage module 215. The processing performed by the image/LIDAR fusion module 250 is described in detail next.

Although the analysis of images with semantic segmentation is very effective and adaptive for providing lane marking labels for each pixel of the input images, the category labels cannot always differentiate between different instances of objects with visual characteristics similar to lane markings. For example, some objects in the 2D image space may be mistakenly labeled (or mistakenly not labeled) as roadway lane or boundary markings. As described above, camera limitations, adverse weather or lighting conditions, sensor calibration problems, and the like can conspire to cause the image analysis processing alone to produce erroneous results. As a solution to this problem, the various embodiments disclosed herein provide a fusion of the processed image data with accumulated LIDAR point cloud data to substantially improve the lane marking detection data produced by the multimodal lane detection module 200. This fusion of the processed image data with accumulated LIDAR point cloud data occurs in the image/LIDAR fusion module 250 as shown in FIG. 3.

As described above, the segmented image data including the plurality of piecewise lines for the lane markings and corresponding road image data can be provided as an input to the image/LIDAR fusion module 250. This image data is provided as a representation in a 2D image space. The point cloud accumulator 220 can provide the accumulated LIDAR point cloud data, as described above, as another input to the image/LIDAR fusion module 250. The accumulated point cloud data is provided as a representation in a 3D space. Vehicle metrics and other sensor data can also be provided by the data storage module 215 to the image/LIDAR fusion module 250. As such, the image/LIDAR fusion module 250 receives multimodal sensor data from a plurality of different types of sensor devices. In an example embodiment, the processing performed by the image/LIDAR fusion module 250 can be comprised of the processing operations described below:

1) As described above, the segmented image data including the plurality of piecewise lines for the lane markings and corresponding road image data can be provided as an input to the image/LIDAR fusion module 250. The vehicle metrics can also be provided as inputs to the image/LIDAR fusion module 250. As such, the GPS and IMU data from the vehicle metrics can be used to align and orient the segmented image data with a terrain map corresponding to the geographical location where the host vehicle is located and from where the images of the segmented image were taken. Terrain maps are well-known to those of ordinary skill in the art. As also well-known, terrain maps can include elevation information as well as feature information associated with a latitude/longitude. The terrain map can provide a grid representation wherein each cell of the grid represents the elevation of the road surface at the latitude/longitude position corresponding to the cell. Thus, terrain maps can provide a 3D representation of the geographical location where the host vehicle is located and from where the images of the segmented image were taken. Given the segmented image data, which can be aligned and oriented with the terrain map, the 2D segmented image data can be back-projected onto the terrain map thereby enabling a transformation of the 2D segmented image data to a 3D space with the terrain map elevation data. Because the segmented image data is aligned and oriented with the terrain map, the plurality of piecewise lines for the lane markings and corresponding road image data from the segmented image data can be associated with a location and an elevation in 3D space.

2) The 3D segmented image data, generated as described above and including the plurality of piecewise lines for the lane markings, can be used to identify candidate LIDAR points of the accumulated 3D LIDAR point cloud data that may be associated with a lane marking in 3D space. In particular, the image/LIDAR fusion module 250 processes each LIDAR point to determine if the distance between the position of the LIDAR point in 3D space and the position of at least one of the piecewise lines is smaller (e.g., not greater than or equal to) than a pre-determined threshold. If the LIDAR point is within the pre-determined threshold of at least one of the piecewise lines corresponding to a lane marking in 3D space, the LIDAR point is considered a candidate associated with that lane marking. Because of perspective projection, the projected points farther away (at a greater distance from the camera) are expected to require a linearly decreasing distance from the one or more of the piecewise lines and still be considered a candidate LIDAR point. To solve the unbalanced problem produced by the perspective projection in an example embodiment, the pre-determined threshold can be implemented as a linearly decreasing decimal value as a function of the distance from the camera in 3D space. As such, the pre-determined threshold will be larger for points close to the camera position and smaller for points more distant from the camera position.

3) Having determined a set of candidate lane marking LIDAR points in the previous processing operation, the LIDAR points of the accumulated 3D LIDAR point cloud can be separately marked as road surface candidates based on the road segmentation data produced by the deep image analysis module 225. As described above, the road segmentation data can be transformed to 3D space using the terrain map. The 3D LIDAR points marked as road surface candidates correspond to points labeled as road surface pixels during the image segmentation process described above.

4) At this point, the image/LIDAR fusion module 250 has used the multimodal sensor data to identify a set of candidate lane marking LIDAR points and a set of candidate road surface LIDAR points in 3D space. Given the standard characteristics of LIDAR point data, each LIDAR point has an associated intensity. In this processing operation, the image/LIDAR fusion module 250 fits a Gaussian distribution $N(m, \sigma)$ for the road surface intensity using the set of candidate road surface LIDAR points. Given the Gaussian distribution $N(m, \sigma)$ for the road surface intensity, the image/LIDAR fusion module 250 can set an intensity threshold th for the set of candidate lane marking LIDAR points as a function of the road surface intensity. In one embodiment, the intensity threshold for the set of candidate lane marking LIDAR points can be set to th=m+3σ. It will be apparent to those of ordinary skill in the art in view of the disclosure herein that the intensity threshold th for the set of candidate lane marking LIDAR points can be set to other values. In general, it would be expected that a valid lane marking LIDAR point would have an intensity value greater than the road surface intensity.

5) Having determined the intensity threshold for the set of candidate lane marking LIDAR points, the image/LIDAR fusion module 250 can sum the total number of points in the set of candidate lane marking LIDAR points identified in step 2 set forth above. This total number of candidate lane marking LIDAR points can be denoted as n. Additionally, image/LIDAR fusion module 250 can determine the total number of points in the set of candidate lane marking LIDAR points for which the intensity of the point is greater than the threshold th. This total number of candidate lane marking LIDAR points with an intensity greater than the threshold th can be denoted as n1.

6) The image/LIDAR fusion module 250 can determine if the proportion of the total number of candidate lane marking LIDAR points with an intensity greater than the threshold th relative to the total number of candidate lane marking LIDAR points is greater than a pre-determined threshold. In an example embodiment, the image/LIDAR fusion module 250 can compute the result of n1/n. If this result is greater than the pre-determined threshold, the n1 candidate lane marking LIDAR points with an intensity greater than the threshold th are retained. In this case, a sufficient quantity of the candidate lane marking LIDAR points with a sufficient intensity have been detected and associated with the corresponding lane marking objects identified in the processed images. If there is not a sufficient quantity of the candidate lane marking LIDAR points with a sufficient intensity, all of the n candidate lane marking LIDAR points are retained; because, the lane marking detected from the image and LIDAR data analysis may originate from special lane separators, such as cat's eyes or reflectors, which may not produce an expected level of intensity from the LIDAR sensor.

7) Once the candidate lane marking LIDAR points are retained as described above, the image/LIDAR fusion module 250 can pass the retained lane marking LIDAR points to the post-processor module 255 as described below. Because the retained points are LIDAR point data and LIDAR point data is inherently three dimensional, the lane marking with LIDAR points can be represented and labeled in 3D space. Thus, the image/LIDAR fusion module 250 can produce lane marking data in 3D space, which cannot be accomplished using 2D image data alone.

The post-processor module 255 can use the lane marking LIDAR points in 3D space produced by the image/LIDAR fusion module 250 to produce a lane marking map. In particular, the post-processor module 255 can take the lane marking detection results (e.g., the set of retained 3D LIDAR points indicating the lane markings) produced by the image/LIDAR fusion module 250 from each frame of the input images and track the same lane markings across consecutive image frames or a plurality of image frames. After associating the same lane markings across a plurality of image frames, the post-processor can use smoothing techniques (e.g., a b-spline method) to fit smooth new curves for each lane marking across multiple image frames. The smoothed curves can then be sampled to generate a high-resolution lane marking map. The lane marking map can be output by the post-processor module 255 and provided to other vehicle subsystems for subsequent processing.

As such, the multimodal lane detection module 200 of the example embodiment can produce a lane marking map that can be used to distinguish particular lane or roadway boundary markings. Once the lane markings in the input images and point cloud data are identified, particular inferences can be determined from the presence and location of the lane markings and appropriate vehicle control actions can be initiated.

Figure 6:
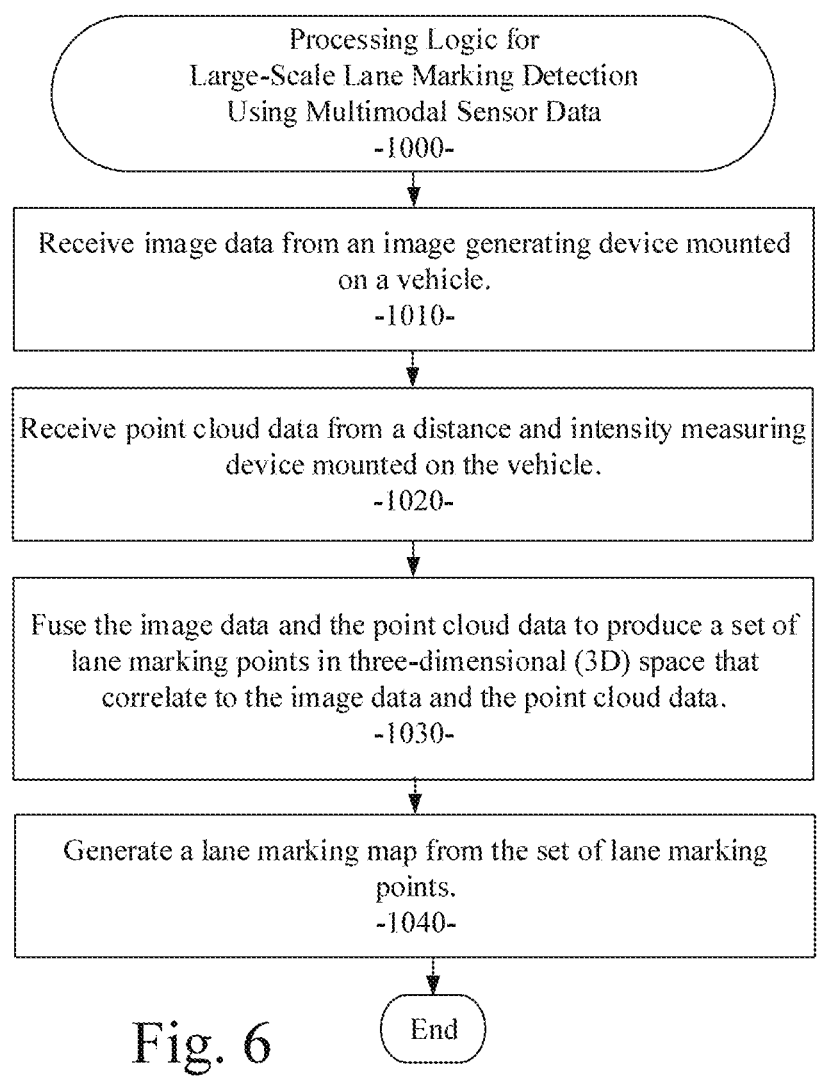
FIG. 6 is a process flow diagram illustrating an example embodiment of a system and method for large-scale lane marking detection using multimodal sensor data.

Referring now to FIG. 6, a flow diagram illustrates an example embodiment of a system and method 1000 for using multimodal sensor data for lane detection. The example embodiment can be configured for: receiving image data from an image generating device mounted on a vehicle (processing block 1010); receiving point cloud data from a distance and intensity measuring device mounted on the vehicle (processing block 1020); fusing the image data and the point cloud data to produce a set of lane marking points in three-dimensional (3D) space that correlate to the image data and the point cloud data (processing block 1030); and generating a lane marking map from the set of lane marking points (processing block 1040).

As used herein and unless specified otherwise, the term "mobile device" includes any computing or communications device that can communicate with the control system 150 and/or the multimodal lane detection module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the control system 150 and/or the multimodal lane detection module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise)

that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the control system 150 and/or the multimodal lane detection module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The control system 150 and/or the multimodal lane detection module 200 can be implemented using systems that enhance the security of the execution environment, thereby improving security and reducing the possibility that the control system 150 and/or the multimodal lane detection module 200 and the related services could be compromised by viruses or malware. For example, the control system 150 and/or the multimodal lane detection module 200 can be implemented using a Trusted Execution Environment, which can ensure that sensitive data is stored, processed, and communicated in a secure way.

Figure 7:
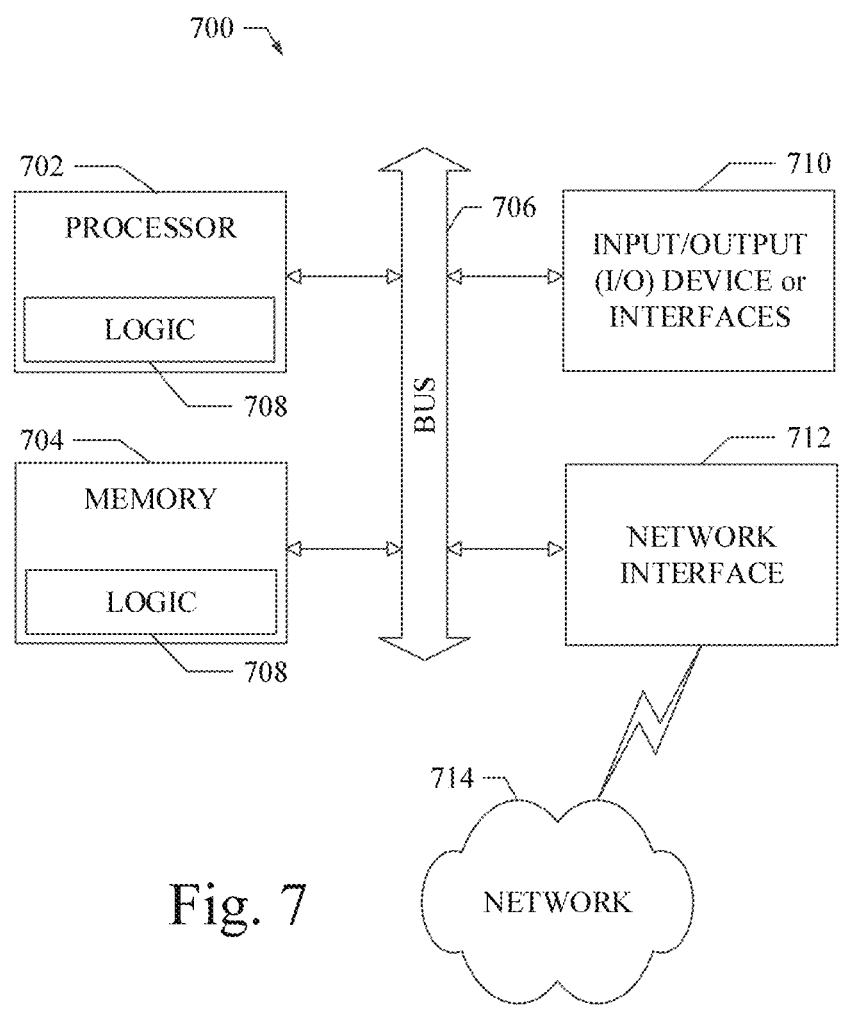
FIG. 7 shows a diagrammatic representation of machine in the example form of a computer system within which a set of instructions when executed may cause the machine to perform any one or more of the methodologies discussed herein.

FIG. 7 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    a data processor; and
    a multimodal lane detection module, executable by the data processor, the multimodal lane detection module being configured to:
        receive image data from an image generating device mounted on a vehicle;
        fit piecewise lines for each lane marking object detected in the received image data;
        receive point cloud data from a distance and intensity measuring device mounted on the vehicle;
        fuse the image data and the point cloud data to produce a set of lane marking points in three-dimensional (3D) space that correlate to the image data and the point cloud data based on a threshold, the threshold being linearly decreased according to a perspective depth of the lane marking points, the threshold being larger for lane marking points close to a position of the image generating device and smaller for lane marking points more distant from the position of the image generating device; and
        generate a lane marking map from the set of lane marking points.

2. The system of claim 1 wherein a neural network is used for identifying and labeling objects in the image data with object category labels on a per-pixel basis.

3. The system of claim 2 wherein the neural network is configured to categorize each of pixels of the image data into classes corresponding to each of the lane marking object.

4. The system of claim 1 wherein the image generating device includes an image camera or a motion video camera.

5. The system of claim 1 wherein the distance and intensity measuring device includes a laser range finder.

6. The system of claim 1 being configured to receive vehicle metrics related to an environment or a condition of the vehicle from a vehicle subsystem.

7. The system of claim 1 wherein the fusion including aligning and orienting the image data with a terrain map corresponding to a location and using a terrain map elevation data to transform the image data to the 3D space, wherein the location is a geographical location where the vehicle is located.

8. The system of claim 1 wherein lane markings formed from lane marking points are produced from each frame of the received image data and the corresponding point cloud data.

9. A method comprising:
receiving image data from an image generating device mounted on a vehicle;
fitting piecewise lines for each lane marking object detected in the received image data;
receiving point cloud data from a distance and intensity measuring device mounted on the vehicle;
fusing the image data and the point cloud data to produce a set of lane marking points in three-dimensional (3D) space that correlate to the image data and the point cloud data based on a threshold, the threshold being linearly decreased according to a perspective depth of the lane marking points, the threshold being larger for lane marking points close to a position of the image generating device and smaller for lane marking points more distant from the position of the image generating device; and
generating a lane marking map from the set of lane marking points.

10. The method of claim 9 including tracking lane markings formed from the lane marking points across a plurality of frames of the received image data.

11. The method of claim 10 including associating the same lane markings across the plurality of frames to form the lane marking map.

12. The method of claim 11 wherein a smoothing technique is used to fit smooth new curves for each lane marking across the plurality of frames.

13. The method of claim 9 wherein the fusing includes projecting 3D point cloud data on to two-dimensional (2D) image data, and adding a 3D point cloud point to the set of lane marking points if a distance between a position of the projected 3D point cloud point in 2D space and a position of at least one of the piecewise lines is within a pre-determined threshold.

14. The method of claim 9 including receiving vehicle metrics via a Global Positioning System (GPS), an inertial measurement unit (IMU), or a radar, to determine at least one of a location, an orientation, or a speed of the vehicle.

15. The method of claim 9 including registering the point cloud data within a time range to a common coordinate space.

16. The method of claim 15 including generating an accumulated point cloud representing a collection of the point cloud data over time, wherein the point cloud data are aligned.

17. A non-transitory machine-useable storage medium embodying instructions which, when executed by a machine, cause the machine to:
receive image data from an image generating device mounted on a vehicle;
fit piecewise lines for each lane marking object detected in the received image data;
receive point cloud data from a distance and intensity measuring device mounted on the vehicle;
fuse the image data and the point cloud data to produce a set of lane marking points in three-dimensional (3D) space that correlate to the image data and the point cloud data based on a threshold, the threshold being linearly decreased according to a perspective depth of the lane marking points, the threshold being larger for lane marking points close to a position of the image generating device and smaller for lane marking points more distant from the position of the image generating device; and
generate a lane marking map from the set of lane marking points.

18. The non-transitory machine-useable storage medium of claim 17 wherein a neural network is used for identifying and labeling objects in the image data with object category labels.

19. The non-transitory machine-useable storage medium of claim 18 wherein the neural network is trained by using training images, wherein the training images include contexts of at least one of environments, locations, weather conditions, and lighting conditions.

20. The non-transitory machine-useable storage medium of claim 19 wherein the training images include an object labeling created manually or automated processes.

* * * * *